(12) United States Patent
Li et al.

(10) Patent No.: US 9,244,918 B2
(45) Date of Patent: Jan. 26, 2016

(54) LOCATING ELECTRONIC DOCUMENTS

(71) Applicant: International Business Machines Corporation, Armonk, NY (US)

(72) Inventors: Dong Li, Beijing (CN); Yin Song, Beijing (CN); Zhi Gang Sun, Beijing (CN); Lin Xie, Beijing (CN); Lei Zhang, Beijing (CN); Xuan ZZ Zhou, Beijing (CN)

(73) Assignee: International Business Machines Corporation, Amonk, NY (US)

( * ) Notice: Subject to any disclaimer, the term of this patent is extended or adjusted under 35 U.S.C. 154(b) by 80 days.

(21) Appl. No.: 13/740,385

(22) Filed: Jan. 14, 2013

(65) Prior Publication Data

US 2013/0191405 A1 Jul. 25, 2013

(30) Foreign Application Priority Data

Jan. 21, 2012 (CN) .......................... 2012 1 0019585

(51) Int. Cl.
*G06F 17/30* (2006.01)
*G06Q 10/10* (2012.01)

(52) U.S. Cl.
CPC .... *G06F 17/30011* (2013.01); *G06F 17/30887* (2013.01); *G06Q 10/107* (2013.01)

(58) Field of Classification Search
CPC G06F 17/2247; G06F 17/2705; G06F 17/272
USPC ........................................................ 707/755
See application file for complete search history.

(56) References Cited

U.S. PATENT DOCUMENTS

| | | | |
|---|---|---|---|
| 6,687,741 B1 * | 2/2004 | Ramaley et al. | 709/206 |
| 7,139,812 B2 * | 11/2006 | Dozier et al. | 709/218 |
| 7,487,214 B2 | 2/2009 | Qureshi et al. | |
| 8,027,976 B1 * | 9/2011 | Ding et al. | 707/736 |
| 8,112,363 B2 * | 2/2012 | Carro et al. | 705/59 |
| 8,862,573 B2 * | 10/2014 | Musgrove | 707/722 |
| 8,918,717 B2 * | 12/2014 | Brooks et al. | 715/738 |

(Continued)

OTHER PUBLICATIONS

Dhiwal et al., "MailZoro-Email Based P2P File Sharing," ICON, IEEE 978-1-4244-3805-Jan. 2008, pp. 1-5.

(Continued)

*Primary Examiner* — Rehana Perveen
*Assistant Examiner* — Hicham Skhoun
(74) *Attorney, Agent, or Firm* — Holland & Knight LLP; Brian J. Colandreo, Esq.; Jeffrey T. Placker, Esq.

(57) ABSTRACT

The present disclosure relates to processing computer documents. According to one aspect, a method for locating an electronic document may include acquiring a source document of a target document to be located, wherein the target document has a sending-receiving relation with the source document. Metadata information of the source document may be extracted. The extracted metadata information may be packaged to generate a link to the source document, the link being used for locating the target document. According to an example method and the system, it may be possible to directly and automatically locate the target document having a sending-receiving relation with a source document based on a link to the source document containing metadata information without manually analyzing and extracting the related information on the source document or changing the existing access right to the source document and the target document.

16 Claims, 5 Drawing Sheets

(56) References Cited

U.S. PATENT DOCUMENTS

| | | |
|---|---|---|
| 2002/0188658 A1 | 12/2002 | Ohashi et al. |
| 2005/0021643 A1 | 1/2005 | Watanabe et al. |
| 2006/0095770 A1 | 5/2006 | Baylis et al. |
| 2006/0206570 A1 | 9/2006 | Heidloff et al. |
| 2007/0255741 A1* | 11/2007 | Geiger et al. ............ 707/101 |
| 2007/0283039 A1 | 12/2007 | Kim et al. |
| 2010/0318611 A1 | 12/2010 | Curtin et al. |
| 2011/0179362 A1* | 7/2011 | Craddock et al. ............ 715/752 |

OTHER PUBLICATIONS

Palme et al., MIME Email Encapsulation of Aggregate Documents, such as HTML (MHTML), Network Working Group, Request for Comments: 2110, Category: Standards Track, Document Dated Nov. 16, 2011, pp. 1-20.

* cited by examiner

Mail Information

| | |
|---|---|
| Mail System: | Amail |
| Subject: | A Method of Link to Other's Mail |
| Sender: | sender@aa.com |
| Receiver: | receiver@aa.com |
| Send Time: | 2012-01-09 10:59:00.000000 |

FIG. 4A

Amaillink:// A_Method_of_Link_to_Other's_Mail/ sender_@aa.com/ receiver@aa.com /2012_01_09_10:59:00.000000

FIG. 4B

Amaillink://D23M0037/482576A90028487F/38D46BF5E8F08834852564B500129B2C/2709 2788DF57092C4825797F0048B793

FIG. 4C

LOCATING ELECTRONIC DOCUMENTS

RELATED APPLICATIONS

This application is based on and claims the benefit of priority from Chinese Patent Application 201210019585.2, filed on Jan. 21, 2012, the entire disclosure of which is incorporated herein by reference.

BACKGROUND

The present disclosure relates to the technology of processing computer documents, and more specifically, to a technology of locating a document during the process of document processing with sending/receiving operations.

Currently, people can send and receive a document by various ways. Typical ways for sending/receiving documents include for example an email system, an instant messaging tool, and etc. Taking the email as an example, every email sent can be understood as an electronic document. In many cases, the sender of a mail needs to discuss with the receiver of the email about the content of the email sent previously, and thus the receiver of the email needs to acquire and open the email he received. At this point, the sender of the email has to manually inform the receiver of the email of such information of the email as the subject, the sending time and so on, for example by telephone or an instant messaging tool, in order that the receiver of the email manually look for the email in his inbox and open it. During this process, the sender of the email has to manually read the emails having been sent, to look for and record such information as the subject, the sending time and so on of the email, and the receiver of the email also needs to manually look for the email corresponding to the specific subject tile and the sending time in the inbox according to the information provided by the sender of the email, which is time-consuming and labor-intensive, and not convenient for both the email sending and receiving parties to fast locate the corresponding email sent and received.

There exists a technical solution of providing a document in the form of link. According to this technical solution, it is possible to expedite locating or opening a document pointed to by a link by clicking the link to the document. However, such a link is only a direct location link, which records the information of the location or address where a document is located. However, for the sender of a document, typically he has no access to the computer of the receiver of the document, and the receiver of the document has no access to the computer of the sender of the document either. Especially in the context of the email, an email sender has a completely different access right from the email receiver, therefore, even though the sender provides the location link to a sent email, the email receiver cannot open the sent email in the outbox of the sender pointed to by the link, nor can the email receiver open the corresponding email in the inbox of the receiver by using the link.

SUMMARY

According to one aspect of the present disclosure, there is provided a method for locating an electronic document, comprising acquiring the source document of a target document to be located, wherein the target document has a sending-receiving relation with the source document. The method may also include extracting metadata information of the source document. The method may further include packaging the extracted metadata information to generate a link to the source document, the link being used for locating the target document.

According to one embodiment of the present disclosure, the document may include an email. The metadata information may include one or more of the following information: an email subject, an email sender, an email receiver, a sending time, a receiving time, and an email ID.

According to another aspect of the present disclosure, there is provided a method for locating an electronic document, comprising acquiring a link to the source document, wherein the link to the source document is generated by packaging metadata information of the source document. The method may also include parsing the acquired link to extract the metadata information of the source information contained in the link. The method may further include locating the target document having a sending-receiving relation with the source document by using the extracted metadata information.

According to yet another aspect of the present disclosure, there is provided a system for locating a document, comprising a metadata information acquiring device configured to extract metadata information contained in a source document. The system may also include a link generating device configured to package the metadata information contained in the source document to generate a link to the source document. The system may also include a link parsing device configured to receive the link to the source document and to parse the received link to extract the metadata information contained in the received link. The system may further include a document locating device configured to locate the target document having a sending-receiving relation with the source document by using the extracted metadata information contained in the link to the source document.

According to a method and/or a system of the present disclosure, it may be possible to directly and automatically locate a target document having the sending-receiving relation with a source document based on a link containing metadata information to the source document without manually analyzing and extracting the related information on the source document or changing the existing access right to the source document and the target document.

BRIEF DESCRIPTION OF THE SEVERAL VIEWS OF THE DRAWINGS

Through the more detailed description of some embodiments of the present disclosure in the accompanying drawings, the above and other targets, features and advantages of the present disclosure will become more apparent, wherein the same reference generally refers to the same components in the embodiments of the present disclosure.

FIGS. 4A-4C illustrate instances of the methods of FIG. 2 and FIG. 3 by taking a particular email as an example.

DETAILED DESCRIPTION

Figure 1:
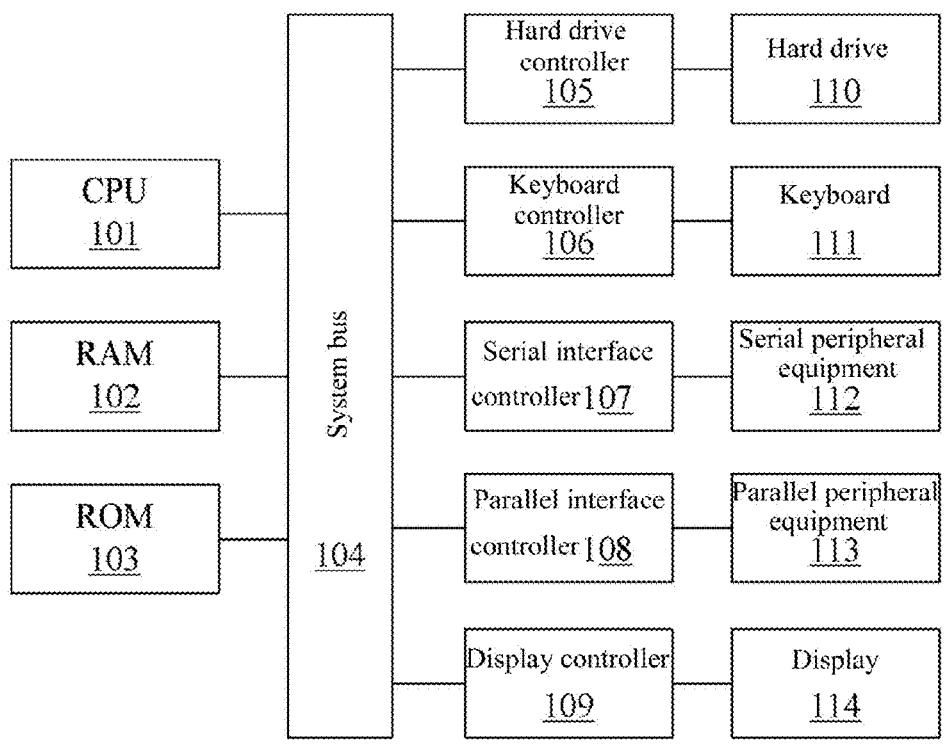
FIG. 1 illustrates a block diagram of an exemplary computing system 100 suitable for realizing an implementation of the present disclosure.

In the following, the methods and systems for locating electronic documents provided by the present disclosure will be described in detail by way of example embodiments with the reference to the accompanying drawings.

According to one possible aspect, the present disclosure may allow automatically locating a target document having a sending-receiving relation with a source document without manually analyzing and extracting the information related to the source document. According to another possible aspect, the present disclosure may provide a method and a system that may automatically locate a target document having a sending-receiving relation with a source document by a link which is not based on location. Further, according to yet another possible aspect, the present disclosure may facilitate locating electronic documents, which have sending-receiving relations with each other, without influencing the existing document access right.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including a target oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to FIG. 1. FIG. 1 shows an example computer system 100 which is applicable to implement the embodiments of the present disclosure. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 may be coupled to the System Bus 104. Hard Drive 110 may be coupled to Hard Drive Controller 105. Keyboard 111 is coupled to Keyboard Controller 106. Serial Peripheral Equipment 112 may be coupled to Serial Interface Controller 107. Parallel Peripheral Equipment 113 may be coupled to Parallel Interface Controller 108. Display 114 may be coupled to Display Controller 109. It should be understood that the structure as shown in FIG. 1 is only for the exemplary purpose rather than any limitation to the present disclosure. In some cases, some devices may be added to or removed from the computer system 100 based on specific situations.

Figure 2:
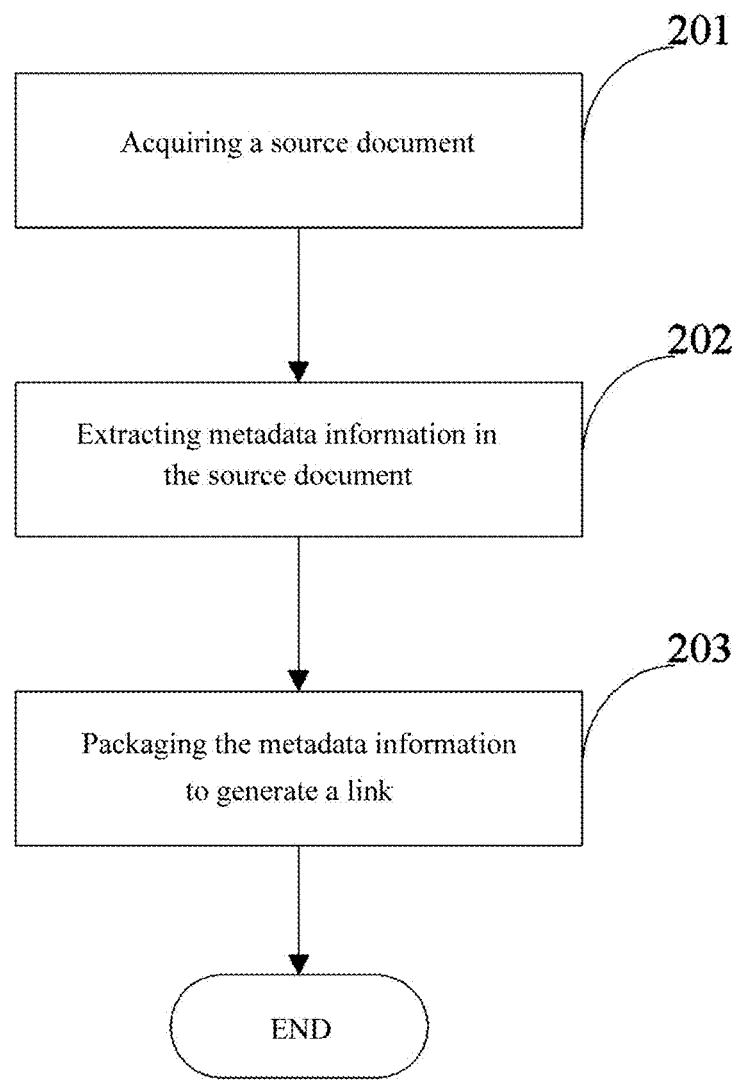
FIG. 2 illustrates a flowchart of a method for locating electronic documents according to an embodiment of the present disclosure.

FIG. 2 illustrates a flowchart of a method for locating electronic documents according to an embodiment of the present disclosure. Before beginning to describe FIG. 2, in the context of the present disclosure, the term "document" may refer to an electronic document unless otherwise specified, i.e. a document may embody any data format which can be read, or accessed, or processed by a computer. The electronic document may include but is not limited to a text document, an email, an instant message, an image data file, an audio/video data file, program code, and so on.

As shown in FIG. 2, at block 201, the source document of a target document to be located may be acquired, wherein the target document may have a sending-receiving relation with the source document. It is noted that "source document" and "target document" are relative concepts and may generally refer to documents having a sending-receiving relation with each other. That is to say, if the source document is the document sent out, for example an email that has been sent, the target document having the sending-receiving relation therewith may include the corresponding email received by the receiver. Whereas, if the source document is the document received, the target document having the sending-receiving relation therewith may include the corresponding document sent out by the sender. It is also noted that "the source document of an target document to be located is acquired" in block 201 should not be understood in a narrow sense as that the target document must be determined first and then the source document of the target document is acquired. In fact, since the target document may have the sending-receiving relation with the source document, it may be possible to determine the source document directly, and the target document corresponding to the source document may be the document needed to be located. For example, the email user John has sent an email A to the email user Tom, and the corresponding email received by Tom is A'. Now John hopes to discuss with Tom about the related content of the email A, thus John may wish to let Tom locate the corresponding email A' received by him based on the email A. In this case, the email A is the source document, and the email A' is the target document.

It should also be noted that there may be various bases upon which the sending-receiving relation may be established, for example, sending/receiving documents through email systems, sending/receiving documents through instant messaging systems, sending/receiving documents through specific file transfer software, relaying through tangible storage medium such as U disk and removable magnetic disk or the like, and downloading or transmitting through intangible medium such as internet, etc.

As shown in FIG. 2, at block 202 metadata information of the source document may be extracted. According to an embodiment of the present disclosure, the metadata information may include one or more of the following information: a document subject, a document size, a document building time, a document modification time, a document sending time, and a document receiving time. The specified metadata information may be extracted from the electronic document accordingly to any generally known manner, and will, therefore, not be described here.

According to an example embodiment of the present disclosure, the document may include an email, and the metadata information therein may include one or more of the following information: an email subject, an email sender, an email receiver, a sending time, a receiving time, and an email ID.

According to another embodiment of the present disclosure, the document may include an image data file, and the metadata information therein may include one or more of the following information: an image subject, an image format, an image size, an image sending time, and an image receiving time.

According to another embodiment of the present disclosure, the document may include an instant message, and the metadata information therein may include one or more of the following information: a message sender, a message receiver, a message sending time, and the first word of the message.

According to another embodiment of the present disclosure, the document may include an audio data file, and the metadata information therein may include one or more of the following information: an audio file subject, an audio format, an audio size, an audio sending time, and an audio receiving time.

At block 203, the extracted metadata information may be packaged to generate a link to the source document for locating the target document. According to an embodiment of the present disclosure, packaging the extracted metadata information to generate a link to the source document may include combining the extracted metadata information according to a specified link format, and encrypting the combined metadata information to generate the link to the source document.

It is to be pointed out that a specific format or order on which the metadata information extracted in block 202 and in which the extracted metadata is combined may be based on, at least in part, different link formats specified. For example, a specified link format may define the number of the combined metadata information, the preferred kind of the metadata information, and the preferred arrangement order. Many pieces of metadata information of the source document may be extracted in block 202, however, in the packaging at block 203, part of the metadata information may filtered out in accordance with a specified link format. The concept of the present disclosure can be embodied in any packaging fashion of metadata information or any specified link format.

It is also to be pointed out that encrypting the combined metadata information is not a necessary step to implement the concept of the present disclosure. At block 203, encryption may not be a required process, rather all the metadata information extracted at block 202 may be simply arranged in order, so as to generate the link to the source document.

The reason why the link to the source document generated at block 203 can be used to locate the target document may be that although the link to the source document may be generated based on the metadata information of the source document, the metadata information of the source document may identify some features of the source document itself, rather than only the feature of the location where the source document is stored, therefore it may be possible to locate the target document having the sending-receiving relation with the source document based on these features of the source document itself.

According to an embodiment of the present disclosure, the link being used for locating the target document may include the link being used for locating the target document by the counterparty of the source document. According to another embodiment of the present disclosure, the counterparty may have access right to the target document, but may not have access right to the source document. If the source document is the document received, the counterparty of the source document may be the sender of the document. Contrarily, if the source document is the document sent, the counterpart of the source document may be the receiver of the document. Therefore, in many cases, the counterparty of the source document may have access right to the target document only, but may not have access right to the source document. Also taking email as an example, if the source document is the sent email in the sender's outbox, the counterparty of the source document may be the receiver. Obviously, typically the receiver may not get direct access to the sent email in the sender's outbox; instead, he may only be able to access the target email received in the inbox of the receiver. However, it is understood by those skilled in the art that it is not necessary for the present disclosure that the counterparty has access right to the target document but no access right to the source document. Even though the counterparty has access right to both the source document and the target document, the concept of the present disclosure still applies that the link not based on location may be provided while the link to the metadata information based on the content feature of the document, accordingly it may be possible to locate the target document by retrieving, rather than locate the source document by directly pointing to its location.

It can be seen from the above description that, with the method shown in FIG. 2, the generated link may contain the metadata information of the source document, and may be used to locate the target document having the sending-receiving relation with the source document. During this process, it may not be necessary to manually analyze and extract the related information on the source document, and it may not be necessary to change the existing access right to the source document and the target document either. The link generated with the method shown in FIG. 2 may not be a link based on location.

Figure 3:
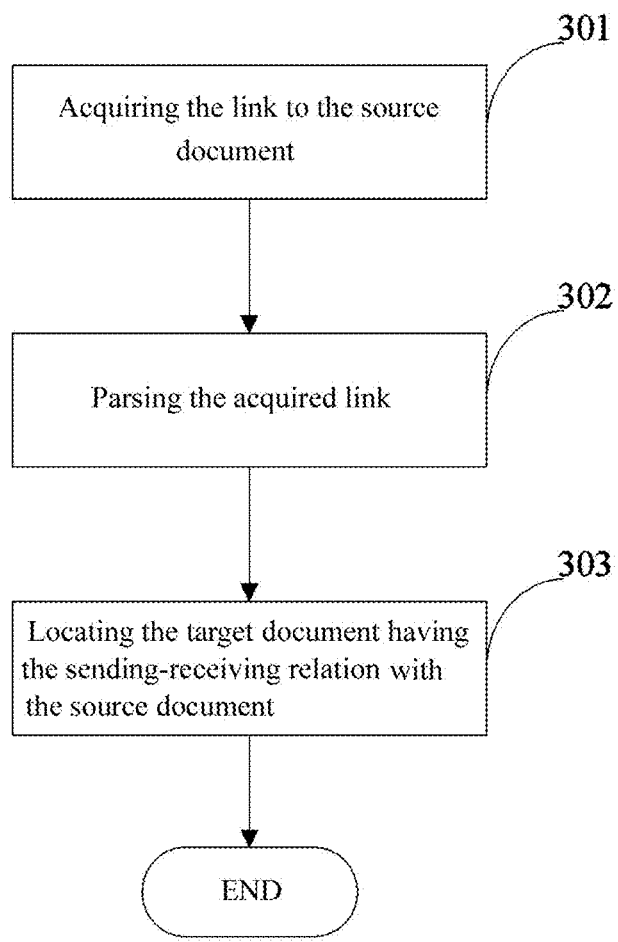
FIG. 3 illustrates a flowchart of a method for locating electronic documents according to another embodiment of the present disclosure.

FIG. 3 illustrates a flowchart of a method for locating electronic documents according to another embodiment of the present disclosure. As shown in FIG. 3, at block 301, a link to the source document may be acquired, wherein the link to the source document may be generated by packaging the metadata information of the source document. According to an embodiment of the present disclosure, the acquired link to the source document may originate from the owner of the source document. For example, the owner of the source document may send the link to the source document to the counterparty of the source document by an instant messaging tool or an email tool or the like. If the counterparty clicks the link, the system may acquire the link to the source document upon receiving the click operation of the counterparty. According to an embodiment of the present disclosure, the metadata information may include one or more of the following information: a document subject, a document size, a document building time, a document modification time, a document sending time, and a document receiving time. According to another embodiment of the present disclosure, the document may include an email, and the metadata information therein may include one or more of the following information: an email subject, an email sender, an email receiver, a sending time, a receiving time, and an email ID.

It is noted that, within the context of the present disclosure, as long as a link to a source document is acquired, it may fall into the scope of the method for locating electronic documents shown in FIG. 3, no matter how the metadata information of the source document is packaged or how the above-mentioned metadata information of the source document may be acquired.

At block 302, the acquired link may be parsed to extract the metadata information of the source document contained in the link. In particular, according to an embodiment of the present disclosure, parsing the acquired link to extract the metadata information of the source document contained in the link may include decrypting the acquired link, and extracting the metadata information contained in the decrypted link.

However, it should be understood decrypting the acquired link may not be necessary. Whether decrypting is needed may depend on whether an encrypting is included in the process of generating the link to the source document. If the link to the source document is generated by arranging the metadata information of the source document together, parsing the acquired link may include separating the metadata information arranged together from each other and extracting them. And, since the link to the source document acquired at block 301 may be generated by packaging the metadata information of the source document, parsing the acquired link and extracting the metadata information contained in the link may be generally accomplished consistent with known techniques.

At block 303, the target document having the sending-receiving relation with the source document may be located by means of the extracted metadata information. Although the link to the source document may be generated based on the metadata information of the source document, the metadata information of the source document may identify some features of the source document itself, rather than identifying only the feature of the position where the source document is stored; therefore it may be possible to locate the target documents having the sending-receiving relation with the source documents based on these features of the source document itself.

In particular, according to an embodiment of the present disclosure, locating the target document having the sending-receiving relation with the source document by means of the extracted metadata information may include using the extracted metadata information as key words, and retrieving the target document in the document storage of the counterparty of the source document, wherein the counterparty may have access right to the target document but may not have access right to the source document. Since the metadata information of the source document may identify some features of the source document itself and the source document may have the sending-receiving relation with the target document (their content is the same), the related features, i.e. the metadata information, of the source document and the target document may be the same. For example, the subject of a sent email of an email sender is usually the same as that of the corresponding email in the inbox of the receiver, the size of the sent email is generally the same as that of its corresponding email received, and the sending and receiving time are usually the same as well if the delay of the server is not considered. Such a nature may exist not only in the email system, but also in all electronic documents having the sending-receiving relation with each other.

As understood by those skilled in the art, techniques to retrieve a document in a corresponding set of documents using key words are generally known, and will not be discussed here again.

It should be understood that the method shown in FIG. 2 may include a process of generating a link to the source document for locating the target document at the source document side, and the method shown in FIG. 3 may include a process of locating the target document using the generated link to the source document at the target document side.

The description is made next in conjunction with a specific embodiment shown in FIGS. 4A to 4C. FIGS. 4A to 4C illustrate an instance of the method shown in FIG. 2 and FIG. 3 taking a specific email as an example.

FIG. 4A illustrates an instance of the metadata information of a source document, i.e. the email having been sent. As can be seen in the example of FIG. 4A, the sender is sender@aa.com, the receiver is receiver@aa.com, the email subject is "A Method of Link to Other's Mail", the sending time is 2012-01-09 10:59:00, and the mail system is Amail. It is possible to combine the metadata information into the format shown in FIG. 4B using the metadata information of this sent email. Further, the text format shown in FIG. 4B may be encrypted as the link shown in FIG. 4C. Then, the sender "sender" can send the link shown in FIG. 4C to the receiver "receiver". The receiver "receiver" clicks the link shown in FIG. 4C, and then the system may parse the link by first decrypting the link into the link as shown in FIG. 4B. Subsequently, the metadata information in the decrypted link shown in FIG. 4B may be extracted, as shown in FIG. 4A. Finally, retrieval may be made in the inbox of the receiver "receiver" by using the extracted metadata information as key words so as to automatically locate the received email (i.e., the target document) corresponding to the sent email (the source document).

Although FIGS. 4A to 4C illustrate an instance of the methods shown in FIG. 2 and FIG. 3 taking the email as an example, it should be understood by those skilled in the art that for any other electronic documents having the sending-receiving relation with each other, it is possible to locate the electronic documents based on the same technical concept.

It should also be noted that although the sender and receiver shown in FIG. 4 both belong to the same email domain name "aa.com", it is also possible to locate the documents by using the concept of the present disclosure even though the sender and receiver belong to different email domain names. The field "Amail" at the head of the instance of the link shown in FIG. 4, i.e., the name for identifying the email system, may adopt different parsing methods according to different names of the email systems during the process of parsing links, and the link formats specified by respective email systems may be known publically.

Figure 5:
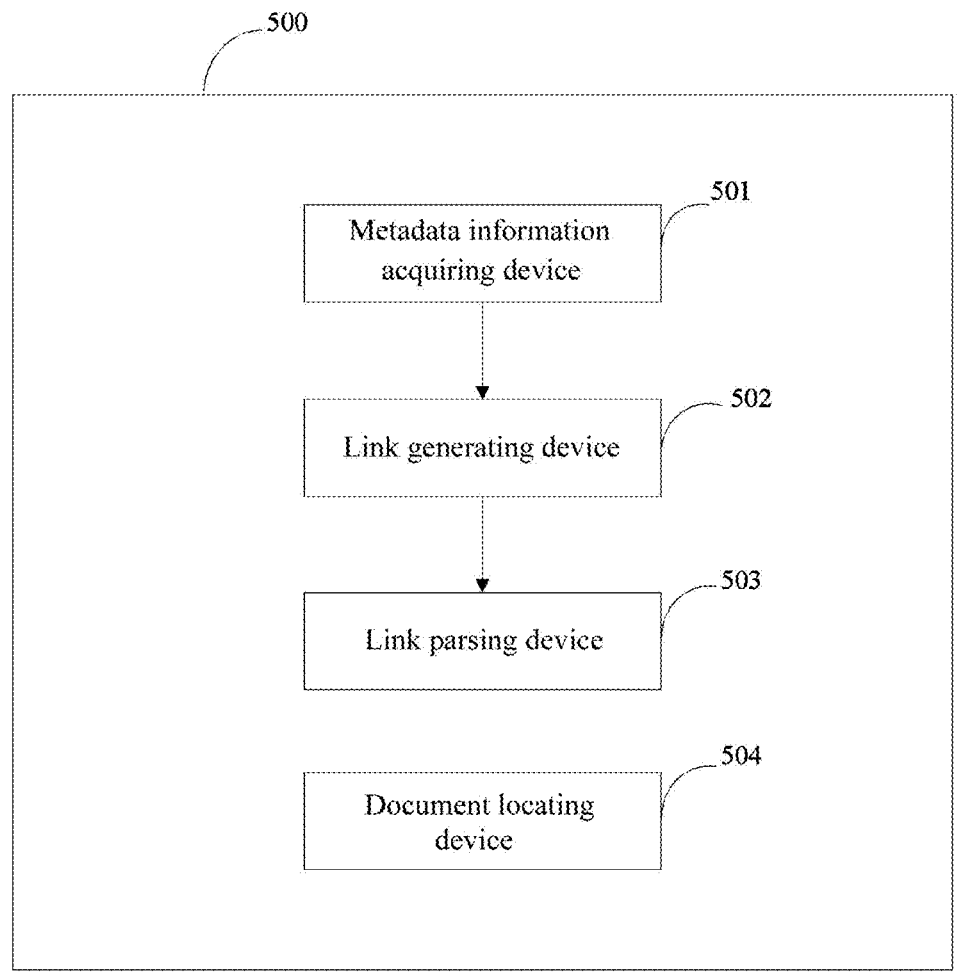
FIG. 5 illustrates a block diagram of a system for locating electronic documents according to an embodiment of the present disclosure.

FIG. 5 illustrates a block diagram of a system for locating electronic documents according to an embodiment of the present disclosure. The example system shown in FIG. 5 is denoted with system 500 in total. In particular, the system 500 may include a metadata information acquiring device 501 that may be configured to extract the metadata information contained in a source document; a link generating device 502 that may be configured to package the metadata information contained in the source document to generate a link to the source document; a link parsing device 503 that may be configured to receive the link to the source document and to parse the received link to extract the metadata information contained in the link received; and a document locating device 504 that may be configured to locate the target document having the sending-receiving relation with the source document by using the extracted metadata information contained in the link to the source document. It should be understood by those skilled in the art that the metadata information acquiring device 501 and the link generating device 502 may implement processes that may generally correspond to the blocks 202 and 203 of the method shown in FIG. 2, and the link parsing device 503 and the document locating device 504 may implement processes that may generally correspond to the blocks 302 and 303 of the method shown in FIG. 3 respectively. It is to be understood that that block 201 shown in FIG. 2 and block 301 shown in FIG. 3 have not been illustrated to include directly corresponding devices in the system 500, which, however, is only for the sake of simplicity. For example, system 500 may include devices generally configured to perform the functionality described with respect to block 201 and/or block 301.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for locating an electronic document, comprising:
   acquiring, by a computing device, a source document of a unique target document to be located, wherein the unique target document has a sending-receiving relation with the source document;
   extracting, by the computing device, metadata information of the source document;
   packaging, by the computing device, the extracted metadata information based upon, at least in part, a specified link format, wherein the specified link format includes a preferred arrangement order of packaging the extracted metadata information;
   encrypting the packaged metadata information to generate a link to uniquely identify the source document from the packaged and extracted metadata information of the source document;
   decrypting the link, extracting the metadata information contained in the decrypted link; and
   locating the unique target document corresponding to the source document using the link, wherein the unique target document is located via key words based upon, at least in part, the extracted metadata information and having a sending-receiving relation with the source document.

2. The computer-implemented method according to claim 1, wherein the metadata information comprises at least one of the following information:
   a document subject, a document size, a document building time, a document modification time, a document sending time, and a document receiving time.

3. The computer-implemented method according to claim 1, wherein the electronic document is an email, and the metadata information comprises one or more of the following information:

an email subject, an email sender, an email receiver, a sending time, a receiving time, and an email ID.

4. The computer-implemented method according to claim 1, wherein the link being used for locating the target document comprises:

a link being used for a counterparty of the source document to retrieve the target document by taking the metadata information contained in the link as key words.

5. The computer-implemented method according to claim 4, wherein the counterparty has access right to the target document, but no access right to the source document.

6. A computer-implemented method for locating an electronic document, comprising:

generating, by a computing device, a link to uniquely identify a source document by packaging metadata information of the source document based upon, at least in part, a specified link format, wherein the specified link format includes a preferred arrangement order of packaging the metadata information;

acquiring, by the computing device, the link to the source document;

parsing, by the computing device, the link to extract the metadata information of the source document contained in the link, wherein the computing device decrypt the acquired link and extract the metadata information contained in the decrypted link; and locating, by the computing device, a unique target document corresponding to the source document having a sending-receiving relation with the source document by using the extracted metadata information of the source document, wherein the unique target document is located via key words based upon, at least in part, the extracted metadata information.

7. The computer-implemented method according to claim 6, wherein the metadata information comprises one or more of the following information:

a document subject, a document size, a document building time, a document modification time, a document sending time, and a document receiving time.

8. The computer-implemented method according to claim 6, wherein the document is an email, and the metadata information includes one or more of the following information:

an email subject, an email sender, an email receiver, an email sending time, an email receiving time, and an email ID.

9. The computer-implemented method according to claim 6, wherein locating the target document having the sending-receiving relation with the source document by using the extracted metadata information comprises:

retrieving the target document in a document storage of a counterparty of the source document by taking the extracted metadata information as key words.

10. The computer-implemented method according to claim 9, wherein the counterparty has access right to the target document, but no access right to the source document.

11. A system for locating a document, the system comprising:

one or more memory; and a hardware processor coupled to the memory;

a metadata information acquiring device configured to extract metadata information contained in a source document;

a link generating device configured to package the metadata information contained in the source document based upon, at least in part, a specified link format, and to generate a link to uniquely identify the source document, wherein the specified link format includes a preferred arrangement order of packaging the metadata information;

a link parsing device configured to receive the link to the source document and to decrypt the link to extract the metadata information of the source document contained in the decrypted link;

a document locating device configured to locate a unique target document corresponding to the source document having a sending-receiving relation with the source document by using the extracted metadata information of the source document contained in the link to the source document as key words.

12. The system according to claim 11, wherein the metadata information comprises one or more of the following information:

a document subject, a document size, a document building time, a document sending time, a document receiving time, and a document modification time.

13. The system according to claim 11, wherein the document is an email, and the metadata information includes one or more of the following information:

an email subject, an email sender, an email receiver, an email sending time, and an email receiving time.

14. The system according to claim 1, wherein the link generating device is configured to:

combine the extracted metadata information according to the specified link format; and encrypt the combined metadata information to generate the link to the source document.

15. The system according to claim 11, wherein the document locating device is configured to retrieve the target document having the sending-receiving relation with the source document in a document storage of a counterparty of the source document by taking the extracted metadata information as key words.

16. The system according to claim 15, wherein the counterparty has access right to the target document, but no access right to the source document.

* * * * *